United States Patent [19]

Vauvelle

[11] Patent Number: 5,125,602
[45] Date of Patent: Jun. 30, 1992

[54] TILTING STICK CONTROL DEVICE, ESPECIALLY FOR AN AIRCRAFT, AND SYSTEM COMPRISING TWO SUCH DEVICES

[75] Inventor: Bernard Vauvelle, Leguevin, France

[73] Assignee: Aerospatiale Societe Nationale Industrielle, Paris, France

[21] Appl. No.: 481,245

[22] Filed: Feb. 20, 1990

[30] Foreign Application Priority Data

Feb. 20, 1989 [FR] France ................. 89 02191

[51] Int. Cl.$^5$ ............... B64C 13/04; B64C 13/12; B64C 13/46
[52] U.S. Cl. ................... 244/223; 244/229; 244/237
[58] Field of Search .......... 244/75 R, 76 A, 175, 244/220, 221, 223, 228, 229, 236, 237; 74/471

[56] References Cited

U.S. PATENT DOCUMENTS

| | | | |
|---|---|---|---|
| 4,050,651 | 9/1977 | Neal et al. ................. | 244/76 C |
| 4,150,803 | 4/1979 | Fernandez ................. | 74/471 XY |
| 4,316,394 | 2/1982 | Dohogne ................... | 74/5.46 |
| 4,441,676 | 4/1984 | Rowarth ................... | 74/471 XY |
| 4,477,043 | 10/1984 | Repperger ................. | 244/223 |
| 4,688,443 | 8/1987 | Fabre et al. .............. | 74/471 XY |
| 4,716,399 | 12/1987 | Nordlund .................. | 250/234 |
| 4,765,568 | 8/1988 | Carl et al. ............... | 244/75 R |
| 4,863,120 | 9/1989 | Zweifel et al. ........... | 244/76 C |
| 4,908,619 | 3/1990 | Balla et al. .............. | 244/187 |

FOREIGN PATENT DOCUMENTS

| | | |
|---|---|---|
| 0352417 | 5/1990 | European Pat. Off. . |
| 3543326 | 6/1987 | Fed. Rep. of Germany . |
| 2245020 | 4/1975 | France . |
| 2114717 | 8/1983 | United Kingdom . |

Primary Examiner—Joseph F. Peters, Jr.
Assistant Examiner—Virna Lissi Mojica
Attorney, Agent, or Firm—Fisher, Christen & Sabol

[57] ABSTRACT

Device for the control of the elements of a machine having a stick (6,7) designed to be activated by one hand of an operator and mounted tilting around at least one axis (X—X) transverse to the stick. The stick is associated with at least one position sensor (17) which deliver an electric signal representing the tilting of the stick around said axis on both sides of a neutral position, the electric signal controlling at least one of the elements of the machine by a calculation device (30). The device also includes at least one torque motor (12,13) associated to said axis (X—X) so that the tilting of the stick (6,70 drives a relative rotation between the rotor and the stator of the torque motor and in that the torque motor is fed by the calculation device (30).

9 Claims, 2 Drawing Sheets

TILTING STICK CONTROL DEVICE, ESPECIALLY FOR AN AIRCRAFT, AND SYSTEM COMPRISING TWO SUCH DEVICES

FIELD OF THE INVENTION

The present invention concerns a control device for a machine, said device being provided with a tilting control stick and designed to be activated by a single hand of an operator.

BACKGROUND OF THE INVENTION

Although not exclusively, this invention particularly concerns aircraft piloting systems and shall hereafter be described in greater detail with reference to such an application, it being understood that this application does not in any way limit the scope of the invention.

A large number of machines, such as planes, helicopters, tanks, civil engineering engines, etc., are provided with a set of controlled elements able to be activated from either of the two connected operators stations controlled by two separate operators (known as the pilot and copilot in the cases of vehicles) and each equipped with a stick type control member articulated so as to be able to pivot in any direction. These two control elements are connected to said members to be controlled and are interconnected so that each of said operators has available the set of the controls of said members to be controlled and so that the deliberate tilting by an operator directly activating one of said control elements results in an identical induced tilting in the same direction of the other control member.

Up until now, the transmission of control orders between a stick activated by an operator and an element to be controlled has been effected mechanically, which required that said sticks needed to be relatively large and were able to bear and transmit large mechanical forces. Such sticks were thus provided directly in front of said operators, were held by both hands of each operator and were activated via a forearm movement of the latter, the amplitude and intensity of their movements being conditioned by the resistances to be mastered so as to handle mechanical controls.

The use of both hands of each operator made it possible, not only to transmit significant forces, but also rendered these forces symmetrical and identical for the two operators.

However, mechanical controls have increasingly been replaced by electric controls having a large number of advantages, relating to certain elements, such as weight, spatial requirement, maintenance, the taking into account of complex control laws, etc. As a result, said sticks are connected to and associated with electric sensors which detect the position variations of said sticks and which control electric controls activating said controlled members according to information supplied by said sensors. In these circumstances, said sticks only transmit extremely small forces and their dimensions and mechanical resistance are able to be considerably reduced. This is the reason why small sticks are now useD, said sticks being known as "minicolumns" or "ministicks" and being able to held and activated by a single hand of an operator. Since these ministicks only transmit small forces and so as to enable said operators to determine the forces they apply to a ministick in order to cause it to tilt and bring it back to a netural position once it is released, it has been necessary to provide at least one force sensation device constituted, for example, by a spring rod.

In addition to the advantages mentioned above concerning the use of electric controls, such ministicks make it possible to free the space in front of the operators so as to optimize the grouping of the other controls in front of said operators, each ministick being disposed laterally in relation to said operators, Furthermore, especially when the two control stations of the operators are parallel (this usually being the case in a vehicle in which said stations are disposed opposite the front of the latter) so as to observe the symmetry of the machine with respect to an axis passing between said stations, one of the ministicks is disposed at the left of the leftside operator and the right ministick is disposed at the right of the rightside operator. In such a case, the leftside operator thus holds the associated ministick in his left hand, whereas the righTside operator holds his ministick in his right hand. Observance of the symmetry of the control of the machine thus results in aN asymmetry at the plane of the operators.

Such as asymmetry causes difficulties when the control of the machine requires lateral tiltings of the ministicks from left to right and vice versa with respect to said operators. This most certainly arises from the human morphology which means that the possibilities for exerting a lateral force by a given hand closed on a ministick differ, depending on whether the force is exerted by pushing inwardly with the palm or by pulling outwardly with the fingers. Moreover, in the disposition described above, a pushing with the palm in one of the control stations corresponds to a traction with the fingers in the other station.

Accordingly, not merely the lateral pushing and traction shall be experienced differently by each operator, but also the asymmetry of the forces is inversed when an order with the left hand at the lefthand station is recorded by a control with the right hand at the righthand station and vice verse. The passing of the order of the machine from one control station to the other is thus effected accompanied by jerks, which may result in serious consequences, especially where an airplane is involved.

So as to overcome these drawbacks, it has already been proposed to provide in a complex machine with a mechanical conjugation and two ministicks a force sensation device connected to each of said control elements so that the force sensation device connected to the control member activated by the left hand is only active when the latter is deliberately and directly activated by an operator from left to right and when the force sensation device connected to the control member activated by the right hand is active when the latter is deliberately and directly activated by an operator from right to left.

Such a twin-ministick mechanical conjugation device provided with complex selective action force sensation devices proves to be satisfactory. However, owing to its mechanical structure, it does not make it possible to optimize the embodiment in an electric form of flight controls. Moreover, this devicE exhibits quite considerable plays and frictions with respect to the clearances and forces employed, and the inertia of moving parts adversely affects correct functioning so that its performances, especially as regards piloting precision, are not as good as one could hope for.

Furthermore, in the event of a deliberate tilting of a stick by an operator, so as to ensure that an induced identical tilting in the same direction is applied to the other stick (position recopying), it is necessary to either provide special motors or to add to this effect the mechanical conjugation device between the two sticks. In any event, such motors are required when the vehicle (airplane) comprises an automatic pilot so that the position of the ministicks corresponds at all times to the control of the automatic pilot.

In addition, it is often necessary to connect to each of said sticks for each of their tilting axes aT least one damper so as to perfect the tiltings of the latter, to limit too rapid displacements and to avoid oscillations which might adversely affect control.

Finally, so as to warn airplane pilots of an anomaly or a flight danger, it is common usage to connect vibrators to said sticks driving the vibration of said sticks. As a result, the operator holding a stick in his hand is aware of these vibrations and is able to take any necessary corrective steps.

Thus, one can easily see that the ministick control devices are complex devices comprising, as they do, force sensation devices (spring rods, leaf springs, scissors, etc), dampers (hydraulic, membrane, friction, etc), motorization means for recopying the automatic piloting phase position or for recopying from one piloting station to another, and vibrators.

SUMMARY OF THE INVENTION

The object of the present invention is to overcome these drawbacks and to simplify such ministick control devices optimizing electric flight controls and by making it possible to obtain the best possible performances and provide increased piloting safety. In addition, the invention in particular makes it possible to suppress the mechanical coupling between the sticks of two ministick devices associated with the piloting of a machine and to resolve the problems mentioned above concerning the inversion of the sensations of forces from one piloting station to the other.

The invention allows for the rationalization of electric flight controls equipped with lateral ministicks as regards the piloting of aircraft, as well as the improvement of aircraft piloting conditions by providing safety, comfort and accuracy.

In order to provide the above-mentioned advantages, the device of the invention, relating to the control of the elements of a machine and comprising a stick intended to be activated by a single hand of an operator and mounted tilting around at least one axis transverse to said stick, said stick being connected to at least one position sensor delivering an electric signal representing the tilting of said stick around said axis on both sides of a neutral position, said electric signal controlling at least one of said elements of the machine by means of calculation means, is notable in that it comprises at least one torque motor connected to said axis so that the tilting of said stick drives a relative rotation between the rotor and the stator of said torque motor and in that said torque motor is fed by said calculation means.

When said stick is mounted tilting around crosswise axes transverse to said stick, position sensors being provided so as to deliver electric signals respectively representative of the tilting of said stick around said axes on both sides of a neutral position, said electric signals controlling elements of said machine by means of calculation means, this device of the invention is notable in that it comprises at least one torque motor connected to each of said axes so that the tilting of said stick around each of the latter drives a relative rotation between the rotor and the stator of the corresponding torque motor and in that said torque motors are respectively fed by said calculation means.

Accordingly, when said stick is tilted, the associated position sensor consigns said electric signal to the calculation means which thus knows at each moment the position of said stick. Said calculation means may therefore consign to the corresponding torque motor an appropriate feeding so that said torque motor generates a torque resistant to the tilting. A force sensation is then obtained without the need to provide additional force sensation devices. By means of the invention, it is this possible to suppress those force sensation devices provided up until now.

In addition, by virtue of the large number of possibilities offered by the calculation means (electronic calculators), it is possible to have any force law desired generated to said torque motors according to the amplitude of the tilting of said stick and/or of the left or right position of saiD stick. For example, the resistance to tilting may vary linearly or parabolically according to said amplitude of tilting or may even exhibit slope or rupture thresholds. It is also possible to feed the torque motors by signals able to simulate hydraulic frictions. Those dampers provided by the prior art are thus becoming out-of-date.

Furthermore, by virtue of said torque motors and their control by said calculation means, it is relatively easy to motorize said sticks, either to recopy the position of one stick by the other or to follow up the controls of the automatic pilot. In fact, in the first case, said calculation means, knowing the position of the stick deliberately tilted, are able to send the free stick an identical tilting by consigning an appropriate order. In the second case, said calculation means know the orders at the control surfaces of the automatic pilot and accordingly are able to move said sticks. Thus, it is possible to suppress the special motorization means previously provided, as well as any mechanical coupling between the sticks.

Finally, one can readily understand that in cases of danger, said calculation means may consign to said torque motors an alternative signal able to cause said sticks to vibrate. The vibrators formerly used can also therefore be suppressed.

By means of the invention, it can be seen that said torque motors collectively serve as force sensation devices, dampers, motorization means and means for coupling between the sticks and as vibrators.

Such torque motors may be of any known type. For example, they may of the samarium-cobalt permanent magnet type and be those commercially known under the references SM 6028 ZA or SM 9620 ZA supplied by the ARTUS company.

Of course, the torque motor(s) associated with a tilting axis may be either mounted directly on said axis or be connected to the latter by a connecting rod link or gear train. In the latter case, it is possible to obtain a movement amplification.

In addition, if the ministick device is provided so that said ministick is able to revolve or tilt around an additional axis, it is clear that one or more torque motors can be associated with the rotation or tilting of said ministick around said additional axis.

BRIEF DESCRIPTION OF THE DRAWINGS.

The figures of the accompanying drawing shall reveal how the invention may be embodied. Identical references on these figures denote similar elements.

DETAILED DESCRIPTION OF THE PREFERRED EMBODIMENTS

Figure 1:
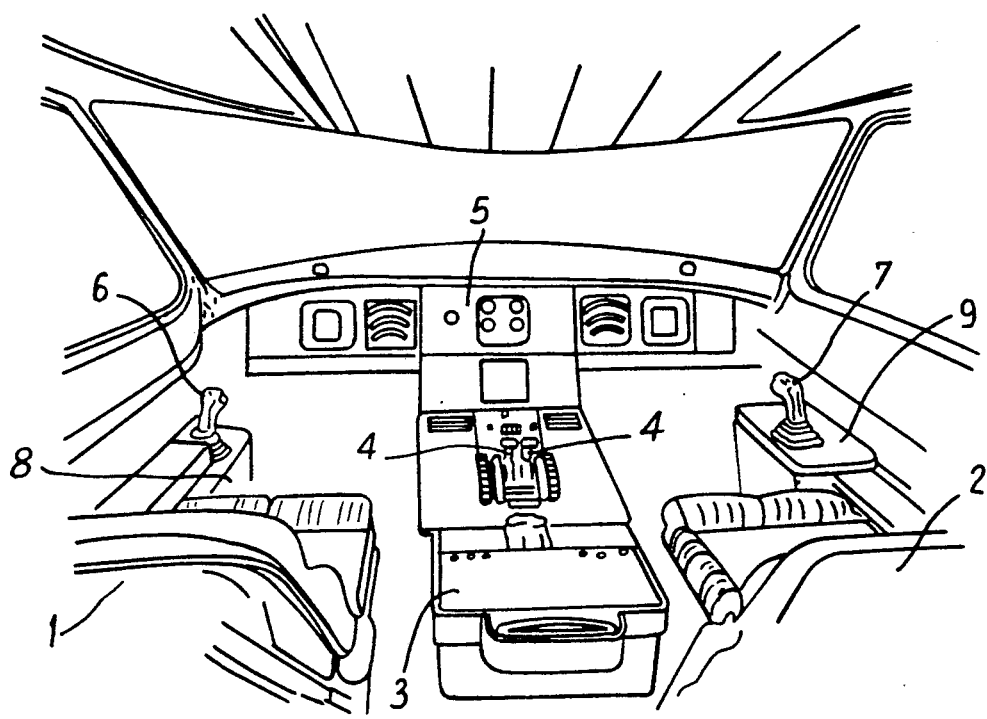
FIG. 1 is a perspective partial view from the rear towards the front of an piloting station of a large-capacity civil aircraft equipped with lateral ministicks.

FIG. 1 diagrammatically partly represents a perspective axial view from the rear towards the front of the piloting station of a modern large-capacity civil aircraft and comprising a seat 1 for a pilot and a seat 2 for a copilot. The piloting location intended for the pilot is normally found on the left, whereas that of the copilot is found on the right. The two piloting locations are separated from each other by a central console 3 provided with a plurality of control elements, such as gas control handles 4. Various control elements are also provided on the instrument panel 5.

It shall be observed that, in the piloting station shown on FIG. 1, the two piloting sticks, usually found respectively in front of the pilot and the copilot and designed to be held and operated by both hands, are been suppressed. These normally used large sticks have been replaced by plain pivoting handles 6 and 7 respectively disposed at the left of the pilot and at the right of the copilot; thus, the handle 6 is intended to be activated by the left hand of the pilot and the handle 7 by the right hand of the copilot. For example (see also FIGS. 2 and 3), the aircraft is depth-controlled by tilting the handle 6 or the handle 7 parallel to the median longitudinal plane of the aircraft around a transverse axis X—X and rolling by tilting one of said handles laterally, transversally to said median longitudinal plane around a longitudinal axis Y—Y. As shall be seen subsequently, each handle, from a neutral position N, may be tilted towards the front (arrow FAV), towards the rear (arrow FAR), towards the right (arrow FD) and towards the left (arrow FG).

The handles 6 and 7 are known as "ministicks" and are electrically coupled so that the aircraft is able to be piloted from either ministick or from both.

Figure 2:
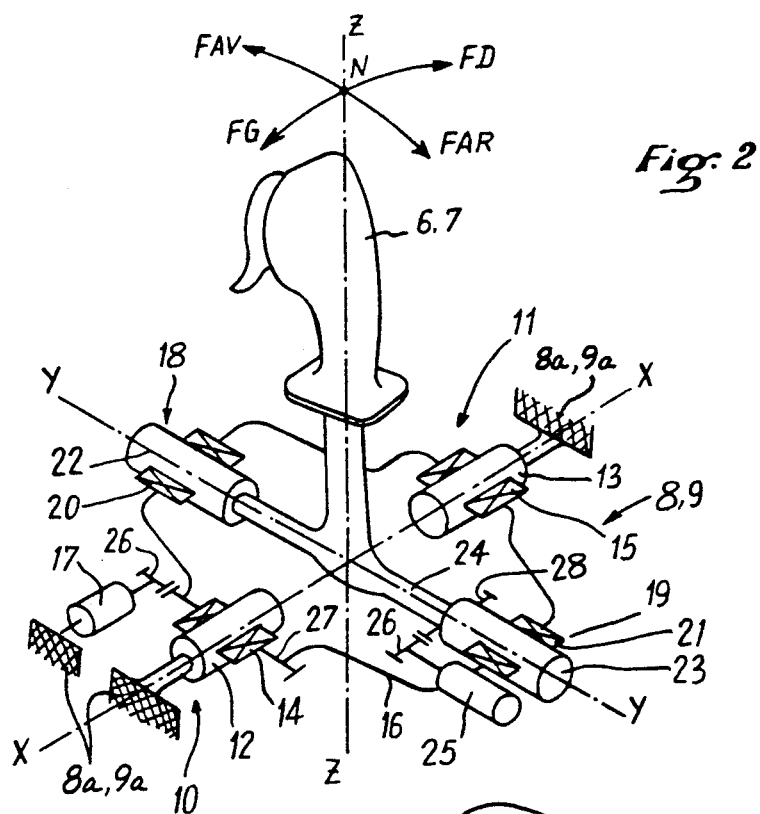
FIG. 2 represents the block diagram of an entire ministick and its sensors according to the invention.
Figure 3:
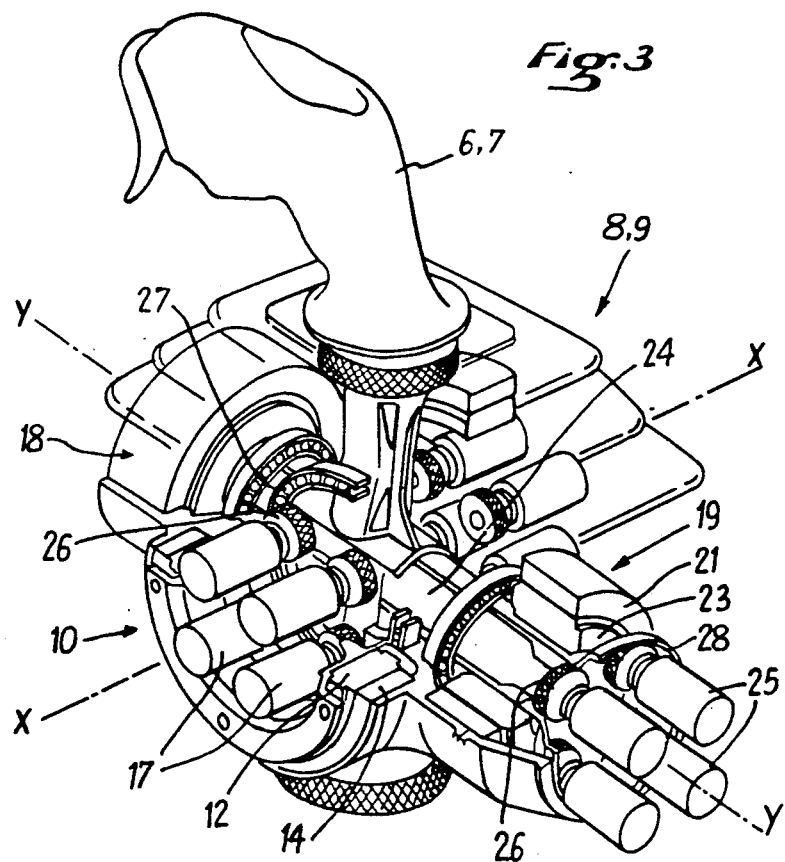
FIG. 3 shows a pull-up view of an embodiment of a complete ministick and its sensors, diagrammatically illustrated by FIG. 2.

As shown by FIGS. 2 and 3, each handle 6 and 7 is respectively connected to a mechanism 8 or 9.

Each of said mechanisms 8 or 9 represented comprises:

two torque motors 10 and 11 aligned on the axis X—X with their rotors 12 and 13 being fixed with respect to the piloting station (as integral with the casing 8a,9a of said mechanisms) and with their stators 14 and 15 being integral with a tilting unit 16;

at least one fixed position sensor 17 able to indicate the position of the tilting unit 16 around the axis X—X;

two torque motors 18 and 19 aligned on the axis Y—Y and whose stators 20 and 21 are integral with said tilting unit 16 and whose rotors 22 and 23 are integral with a common shaft 24 integral with said handle 6 or 7; and at least one position sensor 25 borne by the tilting unit 16 and able to indicate the position of the handle 6, 7 around the axis Y—Y.

The position sensors 17 and 25 are, for example, of the rotating type and their axis bears a gear 26 respectively gearing with a toothed wheel 27 integral with the tilting unit 16 and concentric to the axis X—X and with a toothed wheel 28 integral with the shaft 24 and concentric to the axis Y—Y.

In the practical embodiment shown by FIG. 3, four sensors 17 and four sensors 25 have been provided for redundancy purposes.

Figure 4:
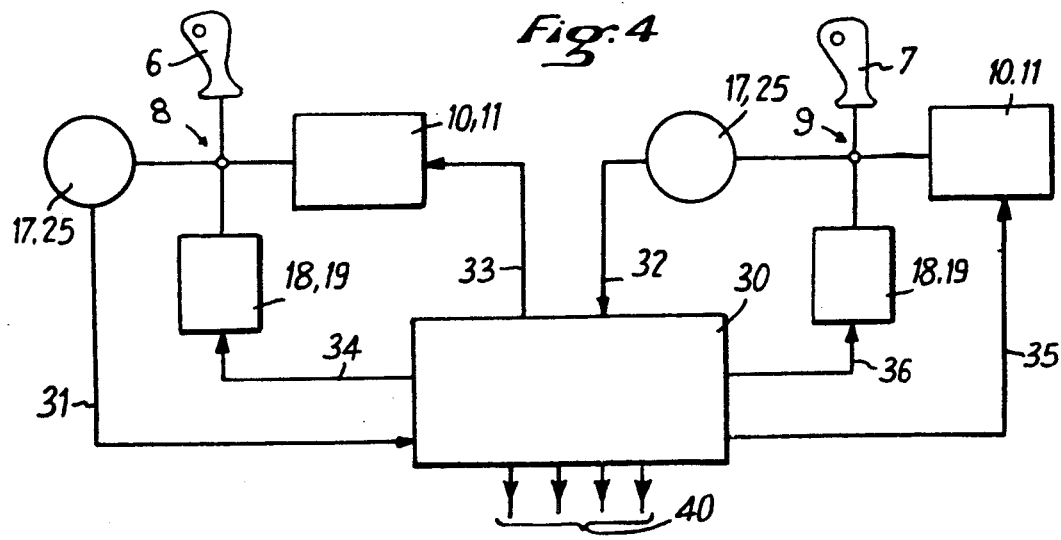
FIG. 4 shows the synoptic diagram of a control system conforming to the invention and provided with two coupled ministicks.

In the flight control system diagrammatically and partly shown on FIG. 4, calculation means 30, for example made up of several calculators, have been provided. These calculation means are connected:

- to the sensors 17 and 25 of the mechanism 8 by lines 31;
- to the sensors 17 and 25 of the mechanism 9 by lines 32;
- to the torque motors 10 and 11 of the mechanism 8 by lines 33;
- to the torque motors 18 and 19 of the mechanism 8 by lines 34;
- to the torque motors 10 and 11 of the mechanism 9 by lines 35;
- to the torque motors 18 and 19 of the mechanism 9 by lines 36; and
- to the control surfaces to be controlled (not shown) by lines 40.

For example, when a ministick 6 or 7 is deliberately tilted around the axis X—X towards the front (arrow FAV) or towards the rear (arrow FAR), this results in firstly a rotation of the sensor(s) 17 and secondly a relative rotation between the stator and the rotor of the torque motors 10 and 11.

The signal thus generated by the sensor(s) 17 is consigned by a line 31 to the calculation means 30, which therefore knows at each moment the position of said ministick 6 or 7. Consequently, they are able to consign to the controlling surfaces (for example, pitching) by means of a line 40 control orders corresponding to the movement of said ministick. In addition, by means of a line 33, the calculation means 30 consign a feed signal to the motors 10 and 11. This feed signal is a programmed function of the amplitude of the rotation of the ministick 6 or 7 around the axis X—X. Thus, at the output of said torque motors, a load moment is produced opposing the action on the ministick 6 or 7. The pilot activating this ministick then experiences a certain amount of resistance to his action.

From the foregoing, it is relatively easy to understand that, by virtue of the torque motors 18 and 19 and the calculation means 30, a force sensation may also be generated when the ministick 6 or 7 tilts around the axis Y—Y.

The desired force sensation according to said tilting of the ministick 6 or 7 is obtained by accordingly selecting the evolution of the feed signal consigned by the calculation means 30 to said torque motors 10,11,18,19. This evolution may differ depending on whether this involves the ministick 6 or the ministick 7, so as to take into account the control asymmetry between the pilot and the copilot.

Moreover, it is possible to provide for the evolution of said feed signal so that the latter simulates viscous damping characteristics.

Furthermore, if only one ministick 6 or 7 is deliberately tilted by a pilot, one can easily understand that the calculation means 30, which are aware of this tilting, are able to cause the other ministick to identically tilt by suitably controlling its torque motors 10,11 and/or 18,19.

In the case where the aircraft comprises an automatic pilot, the latter is evidently in link with said calculation means 30. Thus, if said automatic pilot is locked-in, the calculation means 30 may require the ministicks 6 and 7 by means of their torque motors 10,11,18,19 to take tilted positions corresponding at each moment to the controls of the automatic pilot.

In addition, in cases of critical flight conditions, the calculations means 30 (which are in relation with all the instrument measurement devices) can consign to the torque motors 10,11,18,19 of the ministicks 6 and 7 an alternative feeding intended to cause the latter to vibrate.

Thus, the invention makes it possible to obtain simple, complete, accurate and light ministicks.

What is claimed is:

1. System for piloting an aircraft, comprising:
   (a) a control stick designed to be activated by the single hand of a pilot and mounted tilting around two crosswise axes transverse to said control stick;
   (b) position sensors provided to deliver electric signals respectively representative of the tilting of said control stick around said axes on both sides of a neutral position;
   (c) calculation means receiving said electric signals and controlling accordingly the aerodynamical surfaces of said aircraft; and
   (d) torque motors arranged such that the tilting of said control stick around each of said axes drives a relative rotation between the rotor and the stator of the corresponding torque motor, said torque motors respectively receiving electric signals from said calculation means dependent upon the relative rotation of said rotor and stator.

2. Device according to claim 1, wherein said torque motors are samarium-cobalt permanent magnet type torque motors.

3. System according to claim 1, further comprising:
   (e) an auxiliary control stick designed to be activated by the single hand of a copilot and mounted tilting around a second set of crosswise axes transverse to said control auxiliary stick;
   (f) auxiliary position sensors provided to deliver a second set of electric signals respectively representative of the tilting of said auxiliary control stick around said second pair of axes on both sides of a neutral position; and
   (g) said control stick and said control auxiliary stick being arranged such that when one the control sticks is hand activated and the other one is free, said calculation means delivers said electric signals to said free control stick so that said free control stick recopies the position of said hand activated control stick.

4. System according to claim 1, wherein the delivering of said electric signals to said torque motors by said calculation means simulates a viscous damping.

5. System according to claim 1 comprising an automatic pilot, wherein said calculation means delivers said electric signals to the torque motors so that the position of said stick corresponds with the activator signals given by said automatic pilot to said aerodynamical surfaces.

6. System according to claim 1, wherein the delivering of electric signals to the torque motors by said calculations means is alternative so as to cause said control stick to vibrate.

7. System for piloting an aircraft, comprising:
   (a) a control stick designed to be tilted by a single hand of a pilot and mounted to be tiltable around two crosswise axes transverse to said control stick;
   (b) position sensors for delivering electric signals respectively representative of the tilting of said control stick around said axes on both sides of a neutral position;
   (c) calculation means for receiving said electric signals and controlling accordingly the aerodynamical surfaces of said aircraft; and
   (d) torque motors arranged such that the tilting of said control stick around each of said axes drives a relative rotation between the rotor and the stator of the corresponding torque motor, said torque motors being respectively controlled by said calculation means so that the movement of said torque motors is in direct reaction to said electric signals, whereby said torque motors produce a mechanical effect upon the motion of said control stick.

8. System according to claim 7, wherein said mechanical effect causes a viscous damping upon the motion of said control stick.

9. System according to claim 7, wherein said mechanical effect causes a vibration of said control stick.

* * * * *